United States Patent [19]

Anderson

[11] Patent Number: 5,167,903
[45] Date of Patent: Dec. 1, 1992

[54] APPARATUS FOR SUPPORTING A WORK PIECE ON A WATER TABLE

[76] Inventor: Harry E. Anderson, 307 Foxcroft Rd., Pittsburgh, Pa. 15220

[21] Appl. No.: 875,087

[22] Filed: Apr. 28, 1992

[51] Int. Cl.$^5$ ............................................... B23K 7/08
[52] U.S. Cl. .......................................... 266/49; 266/65
[58] Field of Search ............................ 266/48, 49, 65

[56] References Cited

U.S. PATENT DOCUMENTS

| | | | |
|---|---|---|---|
| 4,047,706 | 9/1977 | Tronvold | 266/65 |
| 4,162,060 | 7/1979 | Anderson et al. | 266/49 |
| 4,453,702 | 6/1984 | Anderson et al. | 266/49 |
| 4,673,103 | 6/1987 | Anderson et al. | 221/186 |
| 4,776,571 | 10/1988 | Lougee | 266/49 |
| 4,887,797 | 12/1989 | Karow | 266/49 |
| 4,986,515 | 1/1991 | Anderson | 266/49 |

Primary Examiner—Scott Kastler
Attorney, Agent, or Firm—Webb, Burden, Ziesenheim & Webb

[57] ABSTRACT

A tray having a bottom wall and upstanding spaced side walls and spaced end walls around the periphery of the bottom wall for use in water table for cutting a metal plate. An edge rail is located parallel to each side wall and is attached to the bottom wall of the tray. Each edge rail has spaced slots for receiving the opposite ends of removable support bars to locate the support bars in the tray. Removable support bars are located in the tray with their opposite ends in the slots in the edge rails. Each removable support bar has an upper edge with spaced upstanding lugs to support a metal plate to be cut into parts.

20 Claims, 4 Drawing Sheets

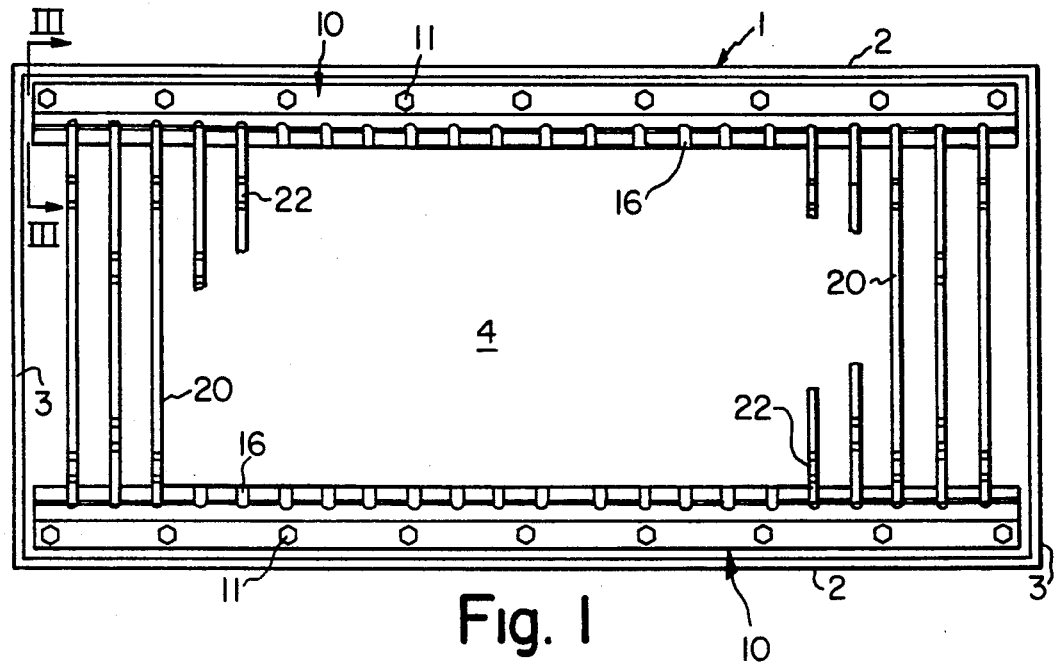
Fig. 1
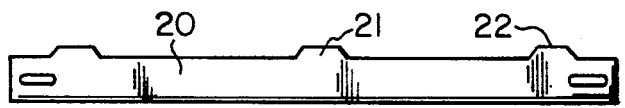
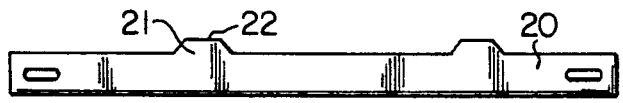
Fig. 2
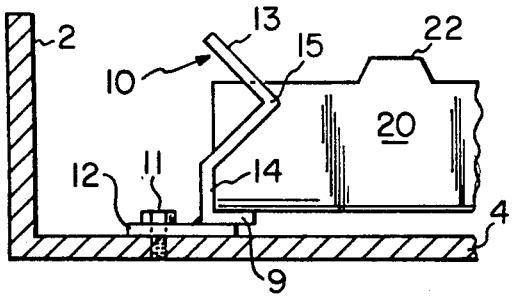
Fig. 3
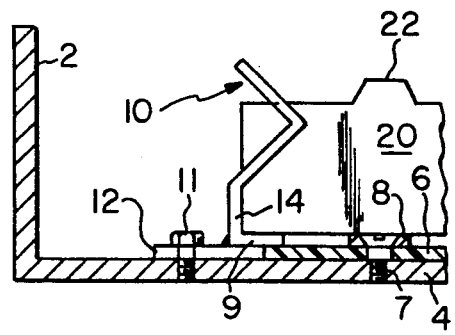
Fig. 4

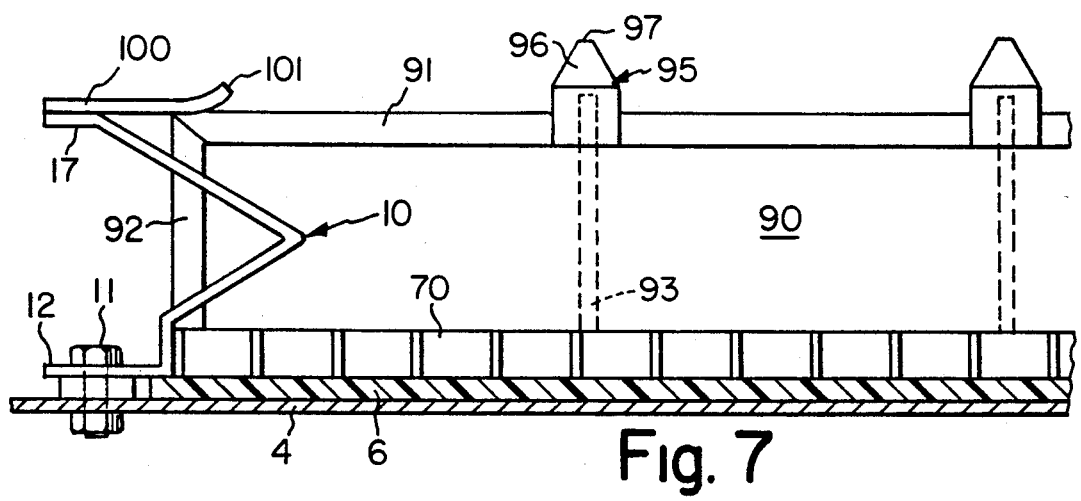
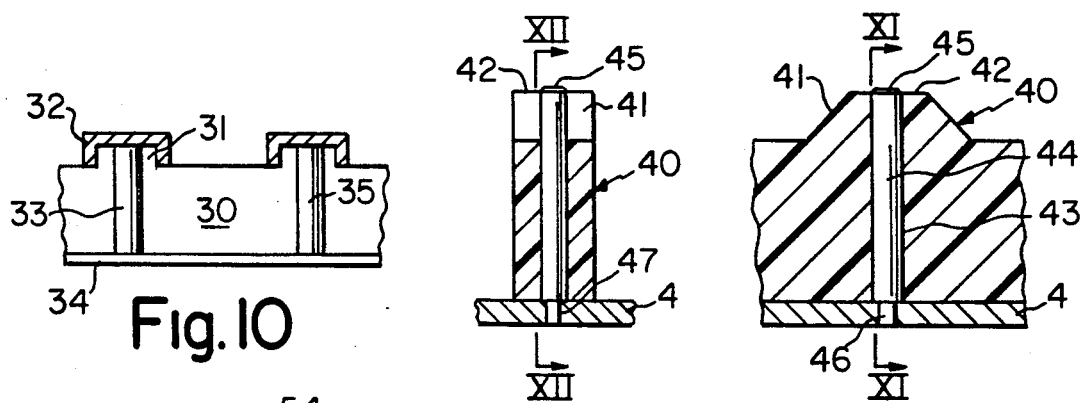
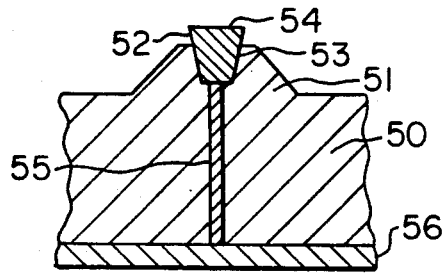
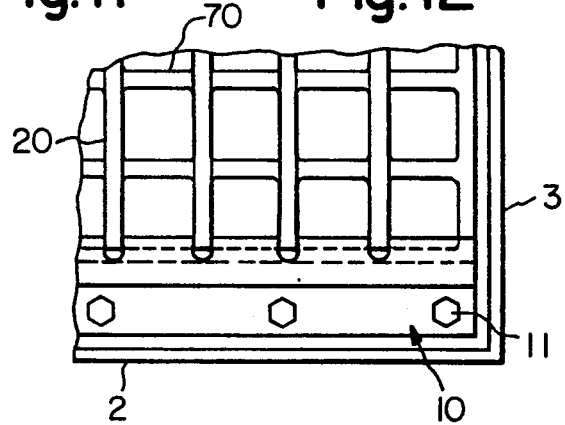
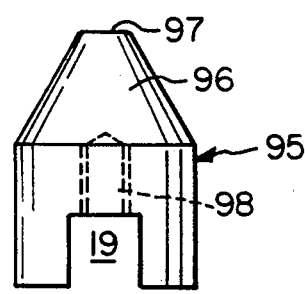

APPARATUS FOR SUPPORTING A WORK PIECE ON A WATER TABLE

BACKGROUND OF THE INVENTION

1. Field of the Invention

The invention relates generally to apparatus for supporting a metal plate in a water table for use with metal cutting machines for cutting parts from the metal plate and more particularly to trays having removable support bars which can be positioned according to the shapes and sizes of the parts which are to be cut from a metal plate.

2. Description of the Prior Art

When cutting a metal plate by either plasma arc cutting or oxy fuel cutting, it is advantageous to immerse the plate in a water bath or position it above the surface of a water bath so that the final part and large skeletal remains are supported above the water bath and the swarf, the scrap and small parts fall into the water bath. When cutting with a plasma arc, the metal plate is grounded to complete the plasma arc transfer process. Grounding the metal plate also enhances the quality of parts cut from the plate and increases operator safety.

Water tables for use with cutting machines are disclosed in U.S. Pat. Nos. 4,162,060 and 4,453,702 and the disclosures thereof are incorporated herein by reference. Those water tables include a plurality of tiltable frames located in open-topped tanks and each frame includes bars which support metal plates to be cut. U.S. Pat. No. 4,673,103 is directed to plate supports in the form of equilateral pyramids which are individually positioned on a cutting surface in accordance with the shape and size of the finished parts which are to be cut from the plate. U.S. Pat. No. 4,986,515 discloses a water table having a support arrangement including intermediate plate support members positioned above a frame which are lowered to contact the upper surface of the metal plate during cutting. Control means move the plate support members relative to the cutting path of the cutting machine. Each of the moveable plate support members is mounted on a cantilever arm and has an electromagnet which contacts the upper surface of a metal plate while it is cut.

SUMMARY OF THE INVENTION

Water tables according to the invention for use with a cutting machine comprise an open top tank in flow communication with apparatus for changing the water level in the tank such as disclosed in aforementioned U.S. Pat. Nos. 4,162,060 and 4,453,702. The tank supports one or more frames or trays according to the invention. The tray is provided with elongated edge rails having spaced slots to receive the ends of support bars and thereby locate a plurality of spaced removable support bars in a substantially vertical position in each frame or tray during cutting. A metal flange supporting each edge rail is attached to the frame or tray which is mechanically suspended above the bottom of the tank to provide an electrical ground for a metal plate which is being cut with a plasma arc. The frames or trays may be pivotally mounted in the tank as disclosed in the aforementioned United States patents. The use of removable support bars for the metal plate facilitates the removal of the swarf, the scrap and small parts which accumulate adjacent to the lower edges of the suppor bars.

The removable support bars may be located in different positions in the tray and the number and location of the bars is determined by the shape and the size of the parts which are to be cut from the metal plate. It is desirable to maintain large parts and skeletal remains on the support bars when cutting is completed. It is also desirable to cut the parts without contacting the support points for the plate. Th location and profile of the individual support bars will be determined by a computer software program which is provided with the shape and size of the parts to be cut from the metal plate and which directs the operator where to position the removable support bars having the desired profiles. The bars may be formed from a lightweight synthetic plastic material or they may be made from a more conventional material such as steel, copper, aluminum, wood or a composite thereof. Individual bars can be manually inserted at the desired locations by the operator thereby eliminating mechanized handling equipment. In this regard, each support bar may be formed with one or more handholds to assist in placing the bar in the tray and removing it after cutting is completed and the water is drained from the tank. Because of the utilization of computer software programs to locate the individual support bars, it is possible to use the minimum number of support bars in a tray to support the metal plate to be cut. This results in an efficient and inexpensive operation since only a relatively small portion of a tray may be required for a cutting operation.

In one embodiment the invention is used with a continuous conveyor as disclosed in U.S. Pat. No. 4,220,318 which is incorporated herein by reference. That patent discloses an in-line material handling system for transporting work from one processing station to another, particularly where the work is processed by burning. In this embodiment of the invention, a mechanical contact grounding connection is only formed between the elongated edge rail segments and the support bars in the cutting station of the in-line conveyor to provide grounding during cutting.

After the cutting operation is completed, the in-line conveyor indexes forward one station which reloads the cutting station and presents the cut parts and the scrap to the unload station for unloading. The next index of the in-line conveyor inverts the tray and the vertical support bars 180° and gravity causes the bars to fall out of the tray into a recovery bin from where they are recycled for positioning in a tray in a future cutting operation by the cutting machine operator.

In another embodiment of the invention, copper, brass, stainless steel, steel, iron, ceramic or composite caps are located on upwardly projecting support lugs at intervals along the upper edge of each support bar. The location of the caps is determined by computer software and the caps are installed by the cutting machine operator.

The protective caps provide protection from the flame which decrease the heat which passes to the support bars and thereby makes it possible to manufacture the support bars from a material having a relatively lower heat resistance such as a synthetic plastic material or wood without the support bars being charred or burned.

Also a conductive metal cap can straddle the upper edge of a support bar and runs continuously the full length of the support bar. A vertical metal cap can also straddle each end of the support bar. Thus, when the support bar is inserted into slots in opposed edge rails, the grounding circuit will be completed. On a plastic or wood support bar, the metal cap protects the edges from contact with hot swarf.

In another embodiment of the invention, a downwardly directed frusto-conical hole is formed in the upper end of each support lug to receive the lower end of a frusto-conical metal plug. The lower end of each hole opens into an elongated bore which receives a metal grounding pin having its upper end in contact with a plug in the frusto-conical hole and its lower end in contact with a grounding strip along the lower edge of the support bar.

In another embodiment of the invention, a U-shaped metal edge cap extends along the flat upper edge and the opposite ends of each support bar. A plurality of metal support heads are spaced along the support bar and each metal head has a downwardly opening U-shaped notch in the bottom and fits over the metal edge cap on the upper edge of the support bar. The location of each support head will be dictated by computer software. A downwardly extending rod is attached to each support head at the base of the notch and extends through a bore in the support bar to position the heads along the support bar. The top edge and the end edges ground the individual support heads to the edge rails. Each bore that is not used in a cutting operation has its upper end closed by a plug having a downwardly extending stud located in the upper end of the bore to prevent accumulation and buildup of waste in the bore.

In a further embodiment of the invention, a sheet of a plastic nonstick material or a disposable sheet of burn resistant material covers the upper surface of the bottom of the suspended tray or frame. When the construction is such that the suspended frame does not have continuous bottom surface, the sheet may be placed directly on the bottom surface of the tank where the waste is collected. The sheet may be attached to the bottom of the tray by screws made of a synthetic material such as nylon in order to facilitate easy removal when a sheet must be replaced. The use of the plastic sheet on the upper surface of the bottom wall of the tray or the tank prevents the swarf, scrap and small parts from sticking to the bottom wall and permits easier cleanup at the completion of a cutting operation. Thus, the tank can be emptied as disclosed in U.S. Pat. Nos. 4,162,060 and 4,453,702 and the swarf, scrap and small parts easily slide out of the tray.

In respect of emptying the tray, the removable support bars can be oriented parallel to a pivot edge of a tiltable tray or at an angle to the pivot edge without interfering with emptying. Because the bars can be removed prior to tilting the tray, they have no effect on material removal. Hence, when a tray is tilted, the swarf, scrap and small parts slide to the lower edge. This is not possible in a cutting table having fixed support bars unless the bars are perpendicular to the tilt edge of the tray. Locating the support bars in a direction other than perpendicular to the tilt edge can be an advantage depending upon the shapes of parts to be cut from the metal plate.

In a further feature of the invention a hole is formed in the upper surface of each support lug on the upper edge of a support bar. Each hole receives the smaller end of a frusto-conical copper casting. The utilization of the copper castings creates a relatively large air gap between the upper edge of the support bar and the plate being cut, thereby eliminating direct impingement of the flame on the upper edge of the support bar A further feature of the invention is the installation of a metal grid or screen on the upper surface of the plastic sheet to protect the plastic sheet from contact with scrap and small parts having sharp edges formed during cutting which could damage the surface of the plastic sheet.

A complete understanding of the invention will be obtained from the following description when taken in connection with the accompanying drawings wherein like reference characters identify like parts throughout.

BRIEF DESCRIPTION OF THE DRAWINGS

FIG. 1 is a plan view of a water table tray according to the invention;

FIG. 2 is an elevation of two removable support bars having different profiles;

FIG. 3 is a section on line III—III of FIG. 1;

FIG. 4 is a section similar to FIG. 3 showing a modification of the invention;

FIG. 7 is a section similar to FIG. 3 showing a further modification of the invention;

FIG. 10 is a partial section of a support bar showing a modification of the invention;

FIG. 11 is a section on line XI—XI of FIG. 12 showing a modification of the invention;

FIG. 12 is a section on line XII—XII of FIG. 11;

FIG. 13 is a partial vertical section of a support bar showing a further modification of the invention;

FIG. 14 is a fragmentary plan view of a water table tray showing a modification of the invention;

FIG. 15 is an elevation of a support head shown in FIGS. 6, 7 and 9;

DETAILED DESCRIPTION OF THE PREFERRED EMBODIMENTS

Figure 5:
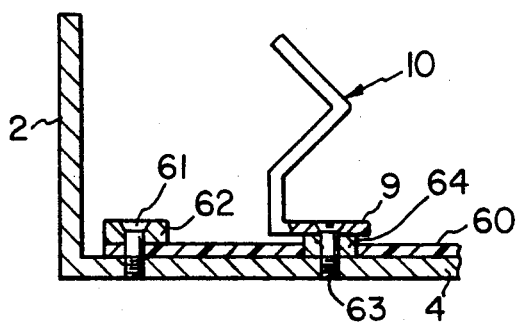
FIG. 5 is a section according to FIG. 3 showing a further modification of the invention.

With reference to FIG. 1 of the drawings, a water table frame or tray 1 is adapted to be suspended in the water tank of a water table (not shown). The tray has a bottom wall 4 with upstanding spaced side walls 2 and end walls 3 attached thereto. A plurality of removable support bars 20 are shown within the tray to support the lower surface of a metal plate which is to be cut into one or more parts. The tray is adapted to be fully or partially submerged during a cutting operation. Thus, when a metal plate is to be cut, water is supplied from a conventional source to fill the tray to the desired level relative to the top of the support lugs on the upper edge of each removable support bar. After a cutting operation is completed, the water is drained from the tray after which the scrap, swarf and small parts are removed from the bottom of the tray and the support bars removed for reuse.

An elongated edge rail 10 extends along each side wall 2 of tray 1 and a flange 9 at the lower edge of each edge rail is attached to a plate 12 which is attached to the bottom wall 4 of the tray by sheet metal screws 11 or other conventional attaching means. While edge rails having a V-shaped portion are shown in the drawings, edge rails having other configurations can also be used. For example, a straight side rail with an attaching flange at its lower edge can be used. Each edge rail 10 has a lower vertical portion 14 integral with flange 9 and a V-shaped portion 15 extending upwardly from portion 14. The V-shaped portion 15 has spaced substantially vertical slots 16 throughout its length to receive the end of a removable support bar.

A plurality of removable support bars 20 having different profiles, as shown, for example, in FIG. 2 of the drawings, extend between edge rails 10 with their opposed ends located in slots 16 in the edge rails as shown in FIGS. 1 and 16-18 of the drawings. The location and number of support bars and the profile of each individual bar are determined by the size and shape of the parts to be cut from the metal plate supported on the bars. The upper edge of each support bar 20 is formed with spaced upstanding lugs 21. The upper surface 22 of each lug 21 is a supporting surface for the lower surface of a metal plate which is to be cut.

As best shown by comparing the support bars in FIG. 2 of the drawings, upstanding lugs 21 have different locations and spacings along the upper edge of an individual support bar 20. Thus, lugs 21 are located adjacent each end and at the center of the upper support bar and are spaced from the ends and the center of the lower support bar. Alternating or staggering support bars having lugs with different locations and spacings will provide support for cut parts having different sizes and shapes. While only two different support bar profiles are shown in FIG. 2 of the drawings, it will be understood by those skilled in the art that numerous different locations and spacings of the lugs can be utilized depending upon the shapes and the sizes of the parts to be cut from a plate.

With reference to FIG. 10 of the drawings, a modified support bar 30 has spaced upward extensions 31 formed along the upper edge. Each upward extension 31 is capped with an inverted U-shaped cap 32 formed of hard copper or another conductive metal in order to conduct electricity during plasma arc cutting. The lower surface of each cap 32 is connected to a metal conducting pin 33 which extends downwardly through a bore 35 in the support bar to the lower edge of the support bar where it is in conductive contact with a metal strip 34 extending along the lower edge of the support bar. The ends of strip 34 on the lower edge of a support bar contact the metal flanges 9 on edge rails 10 and the flanges are connected to ground.

Another modification of the support bar is shown in FIGS. 11 and 12 of the drawings wherein a support bar 40 is formed with upwardly extending lugs 41. An elongated bore 43 extends downwardly through the support bar from the upper surface 42 of each lug 41 to the lower edge of the support bar. A metal conductor pin 44 is located in each bore 43 and the upper end 45 of each pin 44 extends a slight distance above the upper surface 42 of corresponding lug 41 to support the metal plate to be cut. The lower end of each pin 44 has an electrically conductive extension which extends into a hole 47 in the bottom wall 4 of tray to provide a ground during plasma arc cutting.

In a further embodiment of the invention shown in FIG. 13 of the drawings, a support bar 50 has upwardly extending lugs 51 spaced along the upper edge. Each lug has a flat upper surface 52 and is formed with an upwardly opening frusto-conical bore 53. A frustoconical hard copper wedge member 54 is located in some of or all of bores 53. The upper end of each wedge member 54 supports a plate to be cut and the lower end of each wedge member is connected to a metal conductor rod 55 which extends through a bore in the support bar and has its lower end connected to a conductive strip 56 on the lower edge of support bar 50. The ends of strip 56 contact flanges 9 on edge rails 10 to ground the metal plate during cutting. Any bore 53 which does not receive a wedge member 54 is plugged to prevent the accumulation of waste therein.

As an alternative to the grounding arrangement shown in FIG. 13, the rod 55 may be eliminated and each copper wedge member functions as a heat sink to dissipate heat from a metal plate during cutting.

A modified arrangement is shown in FIG. 4 of the drawings wherein a non-stick plastic sheet-like member 6 is located on the upper surface of bottom wall 4 of tray 1 extending between plates 12 for edge rail flanges 9. The sheet-like member 6 protects the upper surface of bottom wall 4 of the tray from gouges and scratches caused by falling scrap and small parts during cutting. It is advantageous to have a relatively smooth upper surface on the bottom wall of the tray to facilitate emptying the tray when it is tilted. The member 6 may be attached to bottom wall 4 by sheet metal screws 7 and grommets 8. The upper surface of the head of each screw 7 is flush with the upper surface of a grommet 8 as shown in FIG. 4 of the drawings.

An alternative arrangement for connecting edge rails 10 to bottom wall 4 of a tray 1 is shown in FIG. 5 of the drawings wherein a nonstick cover 60 is substantially coextensive with bottom wall 4 and lies on the upper surface thereof. Cover 60 extends beneath the removable support bars and is attached to bottom wall 4 by sheet metal screws 61 which extend through grommets 62 into holes in the bottom wall. The flange 9 on each edge rail 10 is formed with chamfered openings to receive the heads of sheet metal screws 63 which extend through the flange and a grommet 64 into a threaded opening 65 in tray bottom wall 4. In this arrangement edge rails 10 are attached to the tray bottom wall and a grommet is provided between the lower surface of flange 9 of each edge rail 10 and the upper surface of tray bottom wall 4 to space the lower surface of the flange above cover 60 and to hold the cover in place on the bottom wall.

A further embodiment of the invention is shown in FIG. 14 of the drawings wherein the upper surface of the bottom wall of the tray is protected from contact with scrap and small parts by a screen or grid 70 located on the upper surface of the bottom wall between the flanges of edge rails 10. Screen or grid 70 may be formed by a magnetic material such as steel or a non-magnetic material such as aluminum. Aluminum is preferred since the screen or grid will not be picked up by an electromagnet during scrap removal from the tray.

In the embodiments of the invention shown in FIGS. 6-9 of the drawings, each removable support bar 90 has a U-shaped copper cap 91 extending along its upper edge and the adjacent surfaces of the side walls. In the embodiments shown in FIGS. 6 and 7 of the drawings, Ushaped copper caps 92 also cover the edge of each end of the support bar and the adjacent surfaces of the side walls. Spaced bores 93 extend through support bar 90 for a purpose to be described hereinafter, and a hole is drilled in the copper cap in alignment with each bore 93. A hard copper support head 95 having a frusto-conical upper portion 96 with four flat sides and an upper support surface 97 on the top is shown in FIG. 15 of the drawings. The support head has a lower portion with a downwardly opening U-shaped notch 94 formed therein which is dimensioned to fit over copper cap 91 on support bar 90. A blind bore 98 is formed in the upper portion of each support head 95 opening into U-shaped notch 94 and the bore is tapped to receive a threaded end of a conductive metal rod 99. The threaded end of rod 99 is screwed into the blind bore of a support head 95 and the support head is then placed onto a support bar 90 with the depending rod extending downwardly through a bore 93 to contact screen or grid 70 or the bottom wall of the tray and U-shaped notch 94 fitted over copper cap 91. This construction provides an electrical ground for a metal plate resting on support surfaces 97 of support heads 95 through copper caps 91 and 92 to the edge rails. The upper ends of bores 93 which do not receive a rod 99 are plugged to prevent the accumulation of material in the bores.

Figure 8:
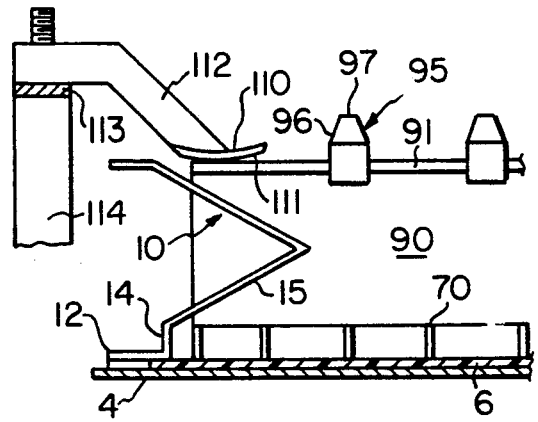
FIG. 8 is a section similar to FIG. 7 showing a modification of the invention.
Figure 6:
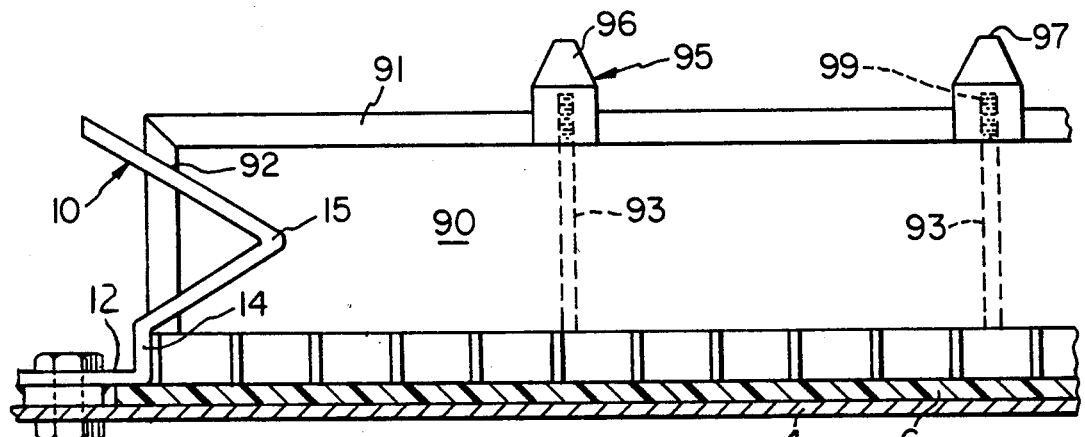
FIG. 6 is a section similar to FIG. 3 showing another modification of the invention.
Figure 9:
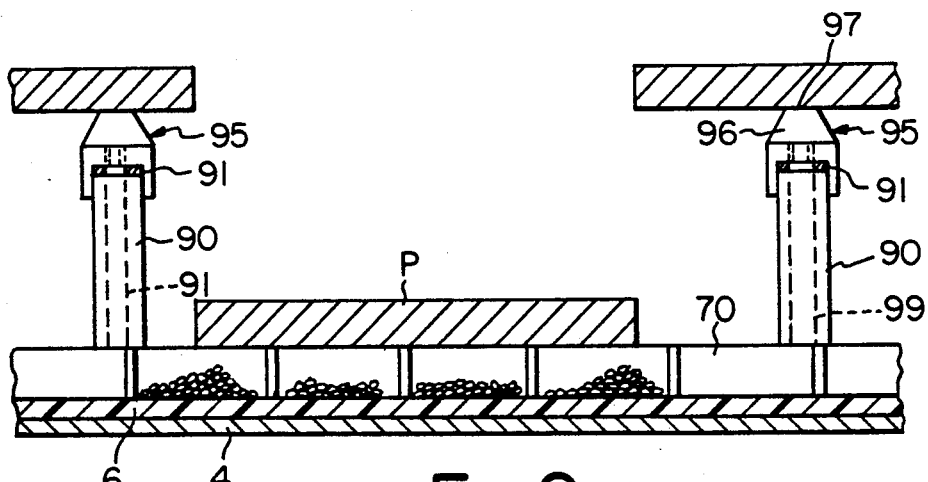
FIG. 9 is a partial section through a water table tray showing a cut part and skeletal remains.

FIGS. 7 and 8 of the drawings show two arrangements including a cantilever contact member for contacting the copper cap on the upper edge of each support bar to ground the support heads 95 on the support bars and a metal plate supported thereon during plasma arc cutting. Thus, in FIG. 7, an elongated resilient cantilever member 100 is attached by welding or other conventional means to a horizontal arm 17 at the upper end of edge rail 10. An upwardly turned lip 101 is formed along the free edge of cantilever member 100. When a support bar is inserted into a notch 16 in edge rail 10, the end of copper cap 91 contacts the lower surface of cantilever member 100 to ground the cap through edge rail 10, member 100 and a grounding bus (not shown). In the arrangement shown in FIG. 8, an elongated flexible cantilever member 110 having an upwardly turned lip 111 along its free end to contact copper caps 91 on support bars 90 is attached to an arm 112 which is connected to an elongated bus 113 which is mounted on a ground post 114 to ground a metal plate resting on the upper surfaces 97 of the support heads 95 which straddle copper cap 91. The metal plate is grounded through support heads 95 and copper caps 91 which contact the lower surface of cantilever member 100. It will be understood by those skilled in the art that upturned lip 101 on flexible cantilever member 100 and upturned lip 111 on flexible cantilever member 110 permit easy insertion of the ends of the removable support bars in notches 16 of the edge rails. The lips act as guides to direct the ends of the removable support bars into notches 16 in edge rails 10.

Figure 16:
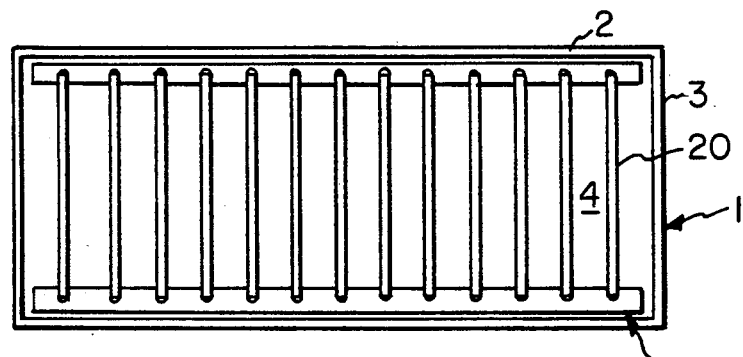
FIG. 16 is a plan view of a water table tray having support bars located perpendicular to the longitudinal axis of the tray.
Figure 17:
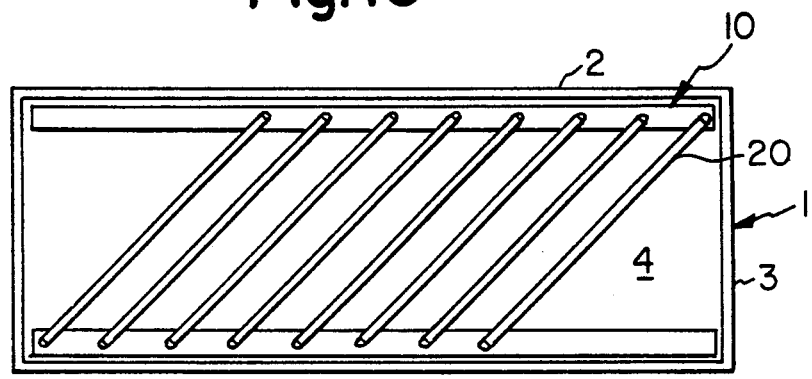
FIG. 17 is a plan view of a water table tray having support bars located at an angle to the longitudinal axis of the tray.
Figure 18:
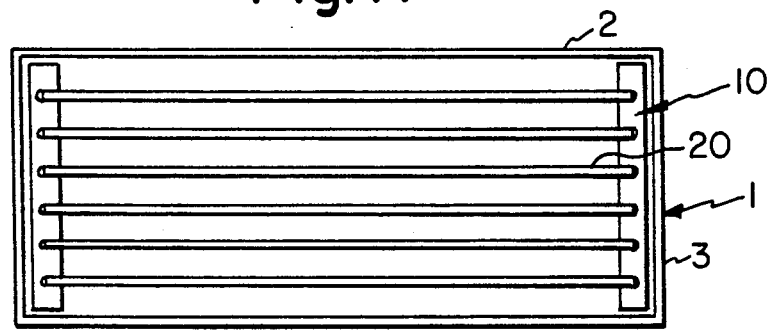
FIG. 18 is a plan view of a water table tray having support bars located parallel to the longitudinal axis of the tray.

FIGS. 16-18 of the drawings illustrate different arrangements of removable support bars 20 relative to side edges 2 of tray 1. The support bars are perpendicular to the side edges in FIG. 5; at an angle to the side edges in FIG. 6 and parallel to the side edges in FIG. 7. The support bars can be arranged in the patterns shown in FIGS. 5, 6 and 7 of the drawings because the support bars are removable. Thus, the bars are removed and then the scrap, swarf and small parts slide to the edge of the tray when it is tilted about a side edge 2. If the support bars are not removable, the arrangements shown in FIGS. 17 and 18 of the drawings would be impractical because the material on the bottom of the tray would not slide down the tray when it is tilted. It can be advantageous to arrange the support bars in patterns dictated by the shape and size of the parts to be cut from a metal plate. It will be understood by those skilled in the art that the support bars and the tray shown in FIGS. 16-18 of the drawings can be formed in accordance with any of the modifications shown and described in the application.

Figure 19:
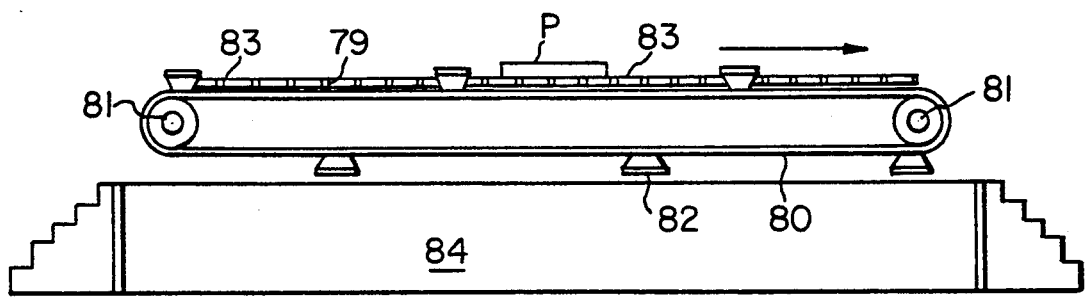
FIG. 19 is an elevation of an embodiment of the invention included in an in-line conveyor.

FIG. 19 of the drawings shows an arrangement wherein removable support bars 79 are supported on the opposed edges of a continuous in-line conveyor 80 such as disclosed in U.S. Pat. No. 4,220,318. The conveyor passes around sprockets 81, one of which is driven and the other of which is an idler. Spaced retainer clips 82 are located on the opposite edges of conveyor 80 to hold removable support bars 79 in position. A metal plate P is supported on the upper surfaces 83 of removable support bars 79. The in-line conveyor shown in FIG. 19 is mounted on a base 84 which includes an open receptacle below the conveyor. The advantage of the arrangement shown in FIG. 19 of the drawings is that removable support bars 79 move with the conveyor into a cutting area, and when cutting is completed, the conveyor passes a sprocket, and the parts and the removable support bars drop into the receptacle in base 84 from which the support bars are removed for reuse. This arrangement eliminates physically removing the support bars at the conclusion of a cutting operation.

The foregoing describes preferred embodiments of the invention and is given by way of example only. The invention is not limited to any of the specific features described herein, but includes all such variations thereof within the scope of the appended claims.

I claim:

1. A tray for use in a water table for cutting a metal plate into parts having different shapes and sizes including a tank. adapted to contain water during cutting and a means to control the water level in the tank, said tray having a bottom wall and upstanding walls attached around the periphery of said bottom wall, a pair of spaced substantially parallel edge rails located substantially parallel to two of said upstanding walls, means for attaching said edge rails to said bottom wall of said tray, each of said edge rails having means for receiving the ends of a plurality of spaced removable support bars to position said support bars at predetermined locations in said tray and maintaining said support bars in a substantially upright position in said tray, a plurality of support bars having opposite ends located in said means in said edge rails for receiving ends of a plurality of spaced removable support bars, each of said support bars having an upper edge and a lower edge and means on said upper edge for supporting a metal plate which is to be cut, said support bars being located in said tray according to the size and shape of parts to be cut from a metal plate, whereby said support bars are removable from said tray when cutting is completed.

2. A water table tray as set forth in claim 1 wherein said means on said upper edge of each of said support bars is a plurality of spaced upstanding lugs, each of said lugs having a top surface adapted to contact a metal plate to support a metal plate and said spaced upstanding lugs being located along said upper edge of adjacent support bars according to the size and shape of the parts to be cut from a metal plate.

3. A water table tray as set forth in claim 2 including a cap covering each of said spaced upstanding lugs, each of said caps having an upper surface adapted to contact a metal plate to support a metal plate, a lateral bore extending from the top surface of each of said upstanding lugs through said support bar to said lower edge of said support bar, a metal electric conductor strip extending along said lower edge of said support bar and a metal electric conducting rod attached to the lower surface of each of said caps and extending through one of said bores to contact said metal strip on said lower edge of said support bar, said metal strip on said lower edge of said support bar contacting at least one of said edge rails to ground said caps and a metal plate supported on said upper surfaces of said caps during cutting.

4. A water table tray as set forth in claim 2 including an elongated bore extending through said support bar from said top surface of each of said lugs to said lower edge of said support bar, an elongated metal electric conductor pin in each of said bores, each of said pins having an upper end extending above the upper surface of an upstanding lug to contact a metal plate to support a metal plate and a lower end contacting said bottom wall of said tray to electrically ground a metal plate supported on said upper ends of said pins.

5. A water table tray as set forth in claim 2 including a frusto-conical hole formed in the upper end of each of said upstanding lugs with its larger end opening at said top surface of said lug, a frusto-conical wedge member having a large end and a small end, said wedge member located in said frusto-conical hole with said small end adjacent the small end of said frusto-conical hole, a bore extending laterally through a support bar from the small end of each frusto-conical hole to said lower edge of said support bar, a metal conductor strip on said lower edge of said support bar and an electric conductor rod attached to the smaller end of each of said wedge members extending through a bore in said support bar to contact said metal conductor strip, whereby said rods electrically ground said wedge members and a metal plate supported on said wedge members during plasma arc cutting.

6. A water table tray as set forth in claim 1 including a U-shaped copper cap overlying said upper edge and each end edge of each of said support bars, said means on said upper edge of each of said support bars for supporting a metal plate is a plurality of support heads spaced along said upper edge of each of said support bars, each of said support heads having an upper frusto-conical portion with a support surface at its upper end and a lower mounting portion integral with said upper portion, a U-shaped notch formed in said lower mounting portion of each of said support heads adapted to fit over said copper cap overlying said upper edge of each of said support bars, an internally threaded blind hole in said lower mounting portion of each of said support heads in communication with said notch whereby said notch fits over said cap, a metal conductor rod having a threaded end screwed into said internally threaded blind hole in said lower portion of each of said support heads and a lateral bore in said support bar below each of said support heads, whereby each of said rods fits into one of said bores to position said support heads along said upper edge of each of said support bars and said support surface contacts a metal plate to support a metal plate to be cut.

7. A water table tray as set forth in claim 6 including a metal conductor strip on said lower edge of each of said support bars and each of said rods has a lower end in contact with said strip, whereby said rods electrically ground said support heads and a metal plate supported on said support surfaces of said support heads during plasma arc cutting.

8. A water table tray as set forth in claim 1 including a plastic non-stick cover on the upper surface of said bottom wall of said tray, said cover extending substantially completely between said edge rails, whereby said plastic cover prevents scrap and small parts from contacting said upper surface of said bottom wall of said tray.

9. A water table tray as set forth in claim 8 including metal grid means on the upper surface of said cover extending substantially completely between said edge rails.

10. A water table tray as set forth in claim 1 including a screen on said upper surface of said bottom wall of said tray, whereby said screen prevents scrap and small parts formed during cutting from contacting said upper surface of said bottom wall of said tray.

11. A water table tray as set forth in claim 1 including grid means on the upper surface of said bottom wall of said tray, said grid means extending substantially between said edge rails, whereby said grid means prevents scrap and small parts formed during cutting from contacting said upper surface of said bottom wall of said tray.

12. A water table tray as set forth in claim 1 wherein said upstanding walls include longitudinal side walls and said edge rails are substantially parallel to said longitudinal side walls, whereby said removable support bars are perpendicular to the longitudinal axis of said tray.

13. A water table tray as set forth in claim 1 wherein said tray is rectangular and said upstanding walls are spaced longitudinal side walls and spaced end walls and said edge rails are substantially parallel to said end walls, whereby said removable support rails are parallel to the longitudinal axis of said tray.

14. A water table tray as set forth in claim 1 wherein said tray is rectangular and said upstanding walls are spaced longitudinal side walls and spaced end walls and said edge rails are substantially parallel to said longitudinal side walls of said tray, and said means in said edge rails for receiving ends of a plurality of support bars are spaced slots and said spaced slots in one of said end rails are offset relative to said spaced slots in the other of said end rails, whereby said removable support bars extend between said edge rails at an angle to the longitudinal axis of said tray.

15. A water table tray as set forth in claim 1 wherein each of said edge rails includes a mounting flange parallel to the upper surface of said bottom wall of said tray when said edge rail is in position in said tray, a leg extending upwardly from said mounting flange, a V-shaped portion extending upwardly from the upper end of said leg, and said means for receiving ends of a plurality of spaced removable support bars is spaced substantially vertical slots formed in said V-shaped portion of each of said edge rails.

16. A water table tray as set forth in claim 1 wherein said means for attaching said edge rails to said bottom wall of said tray is a flange on each of said edge rails, a plate attached to each of said flanges and a plurality of connectors attaching each of said plates to said bottom wall of said tray.

17. A water table tray as set forth in claim 16 wherein said means for attaching said edge rails to said bottom wall of said tray includes insulation between said bottom wall of said tray and a plurality of nylon screws, whereby said edge rails are insulated from said bottom wall of said tray.

18. A water table tray as set forth in claim 1 including an elongated flexible metal ground member extending along at least one of said edge rails in spaced relationship with said bottom wall of said tray and metal conductor means on at least said upper edge of each of said removable support bars for supporting a metal plate during cutting, whereby said metal conductor means is in electrically conductive contact with said elongated metal ground member to ground a metal plate during plasma arc cutting.

19. A water table tray as set forth in claim 1 including an elongated flexible metal ground member, means connected to ground supporting said flexible metal ground member adjacent the upper edge of at least one of said edge rails in spaced relationship with said bottom wall of said tray and metal conductor means on at least said upper edge of each of said removable support bars for supporting a metal plate during cutting, whereby said metal conductor means is in electrically conductive contact with said elongated metal ground member to ground a metal plate during plasma arc cutting.

20. In an in-line material handling system including a conveyor means for supporting a metal plate to be cut into parts the improvement comprising a plurality of clips located along each edge of said conveyor means, each of said clips having means for receiving the ends of spaced removable support bars to position said support bars at predetermined locations along said conveyor means and maintaining said support bars in a substantially upright position relative to said conveyor means, a plurality of support bars having opposite ends located in said means in said clips for receiving ends of spaced removable support bars, each of said support bars having an upper edge and a lower edge and means on said upper edge for supporting a metal plate which is to be cut, said support bars being located along said conveyor means according to the size and shape of parts to be cut from a metal plate, whereby said support bars drop from said conveyor means when cutting is completed and said conveyor means is advanced along the in-line system.

* * * * *